United States Patent
Hossler et al.

(10) Patent No.: US 10,155,527 B2
(45) Date of Patent: Dec. 18, 2018

(54) STACKABLE TRUSSES FOR TRANSPORT AND SUPPORT OF APPLIANCES

(71) Applicant: TIFFIN SCENIC STUDIOS, INC., Tiffin, OH (US)

(72) Inventors: Brad E. Hossler, Tiffin, OH (US); Scott T. Almand, Tiffin, OH (US)

(73) Assignee: Tiffin Scenic Studios, Inc., Tiffin, OH (US)

( * ) Notice: Subject to any disclaimer, the term of this patent is extended or adjusted under 35 U.S.C. 154(b) by 0 days.

(21) Appl. No.: 15/421,910

(22) Filed: Feb. 1, 2017

(65) Prior Publication Data

US 2017/0217467 A1    Aug. 3, 2017

Related U.S. Application Data

(60) Provisional application No. 62/383,173, filed on Sep. 2, 2016, provisional application No. 62/290,260, filed on Feb. 2, 2016.

(51) Int. Cl.
  *B62B 3/02* (2006.01)
  *E04C 3/08* (2006.01)
  *B62B 3/16* (2006.01)

(52) U.S. Cl.
  CPC .......... *B62B 3/022* (2013.01); *B62B 3/16* (2013.01); *E04C 3/08* (2013.01); *B62B 2202/30* (2013.01); *B62B 2205/04* (2013.01); *B62B 2205/14* (2013.01); *B62B 2205/20* (2013.01)

(58) Field of Classification Search
  None
  See application file for complete search history.

(56) References Cited

U.S. PATENT DOCUMENTS

| | | | |
|---|---|---|---|
| 225,831 A | 3/1880 | Hill |
| 883,305 A | 3/1908 | Fetch |
| 1,783,170 A | 11/1930 | Knot |
| 1,897,152 A | 2/1933 | Sustins |
| 1,938,237 A | 12/1933 | Wagenhorst |
| 2,865,546 A | 12/1958 | Shull |
| 2,919,966 A | 1/1960 | Preston |
| 3,001,102 A | 9/1961 | Stiefel et al. |
| 3,224,827 A | 12/1965 | Foster et al. |
| 3,469,709 A | 9/1969 | Wood |
| 3,652,143 A | 3/1972 | Wener |
| 4,295,544 A | 10/1981 | Peterson |
| 4,651,258 A | 3/1987 | Davis et al. |
| 4,723,618 A | 2/1988 | Coonradt |
| 4,723,680 A | 2/1988 | Carroll et al. |
| 4,749,060 A | 6/1988 | Vandelinde |
| 4,802,065 A | 1/1989 | Minter et al. |
| 4,837,665 A | 6/1989 | Hoyer et al. |
| 4,862,336 A | 8/1989 | Richardson et al. |
| 4,912,887 A | 4/1990 | Sullivan |

(Continued)

*Primary Examiner* — James A Shriver, II
*Assistant Examiner* — Hilary L Johns
(74) *Attorney, Agent, or Firm* — Barnes & Thornburg LLP; Alice O. Martin (57) ABSTRACT

An appliance-support system in accordance with the present disclosure includes a truss and a rolling support coupled to the truss. The truss is adapted to support an appliance, such as a light, and in combination with other trusses forms a scaffolding for use above an event stage, for example. The system includes collapsible aspects for ease of storage and stacking.

26 Claims, 11 Drawing Sheets

(56) References Cited

U.S. PATENT DOCUMENTS

| | | |
|---|---|---|
| 5,081,566 A | 1/1992 | Crispin et al. |
| 5,121,812 A | 6/1992 | Ochiai et al. |
| 5,237,792 A | 8/1993 | Oberman et al. |
| 5,278,742 A | 1/1994 | Garrett |
| 5,308,158 A | 5/1994 | Vogelgesang et al. |
| 5,324,689 A | 6/1994 | Yoo |
| 5,333,434 A | 8/1994 | Oberman et al. |
| 5,335,467 A | 8/1994 | Oberman et al. |
| 5,335,468 A | 8/1994 | Oberman et al. |
| 5,432,691 A | 7/1995 | Garrett et al. |
| 5,579,866 A | 12/1996 | Rowell |
| 5,617,931 A | 4/1997 | Zygmun et al. |
| 6,026,626 A | 2/2000 | Fisher |
| 6,073,624 A | 6/2000 | Laurent |
| 6,098,751 A | 8/2000 | Eichenlaub et al. |
| 6,827,409 B2 | 12/2004 | Michael |
| 7,033,044 B2 | 4/2006 | Griffin |
| 7,219,765 B2 | 5/2007 | Gierss |
| 7,588,278 B1 | 9/2009 | Luneack |
| 7,591,497 B2 | 9/2009 | Johns |
| 7,621,605 B2 | 11/2009 | Bond et al. |
| 7,681,747 B2 | 3/2010 | Crowder |
| 7,770,986 B1 | 8/2010 | Simaitis |
| 8,028,488 B2 | 10/2011 | Dodd |
| 8,099,913 B1 | 1/2012 | Dodd |
| 8,177,163 B2 | 5/2012 | Wilcynski et al. |
| 8,517,397 B2 | 8/2013 | Gross |
| 8,757,641 B2 | 6/2014 | Gross |
| 8,893,443 B2 | 11/2014 | Davis |
| 8,950,716 B2 | 2/2015 | Kempf |
| 2005/0206282 A1 | 9/2005 | Walburn |
| 2008/0239709 A1 | 10/2008 | Rapeanu et al. |
| 2009/0173033 A1 | 7/2009 | Baxter |
| 2010/0181738 A1* | 7/2010 | Gross ............. E04C 3/005 280/79.11 |
| 2013/0075993 A1 | 3/2013 | Christie et al. |
| 2015/0084297 A1 | 3/2015 | Chouinard |

\* cited by examiner

STACKABLE TRUSSES FOR TRANSPORT AND SUPPORT OF APPLIANCES

CROSS-REFERENCE TO RELATED APPLICATIONS

This application claims priority under 35 U.S.C. § 119(e) to U.S. Provisional Application Ser. No. 62/290,260, filed Feb. 2, 2016, and to U.S. Provisional Application Ser. No. 62/383,173, filed Sep. 2, 2016, both of which are expressly incorporated by reference herein.

FIELD OF THE DISCLOSURE

The present disclosure relates generally to stage equipment, and more specifically to trusses used to transport and support appliances, such as lights.

BACKGROUND

Lighting and other equipment used for events, such as concerts, plays, or other gatherings, may be held on trusses. The trusses may be transported to an event location and secured together to form scaffolding for positioning the equipment relative to a stage, for example. The size and weight of these trusses presents design challenges to their transportation and storage.

SUMMARY

The present application discloses one or more of the features recited in the appended claims and/or the following features which, alone or in any combination, may comprise patentable subject matter.

An appliance-support system in accordance with the present disclosure includes a truss and a rolling support coupled to the truss. The truss is adapted to support an appliance, such as a light, speaker, or other device used during stage performances or events.

In illustrative embodiments, the rolling base includes a first support frame extending along a first side of the truss and a second support frame extending along a second side of the truss opposite the first side. The rolling base is movable between an expanded-use position where the first and second support frames extend downward from the truss and a collapsed-storage position where the first and second support frames are stored substantially within a boundary defined by the truss.

These and other features of the present disclosure will become more apparent from the following description of the illustrative embodiments.

DETAILED DESCRIPTION

For the purposes of promoting an understanding of the principles of the disclosure, reference will now be made to a number of illustrative embodiments illustrated in the drawings and specific language will be used to describe the same.

Figure 1:
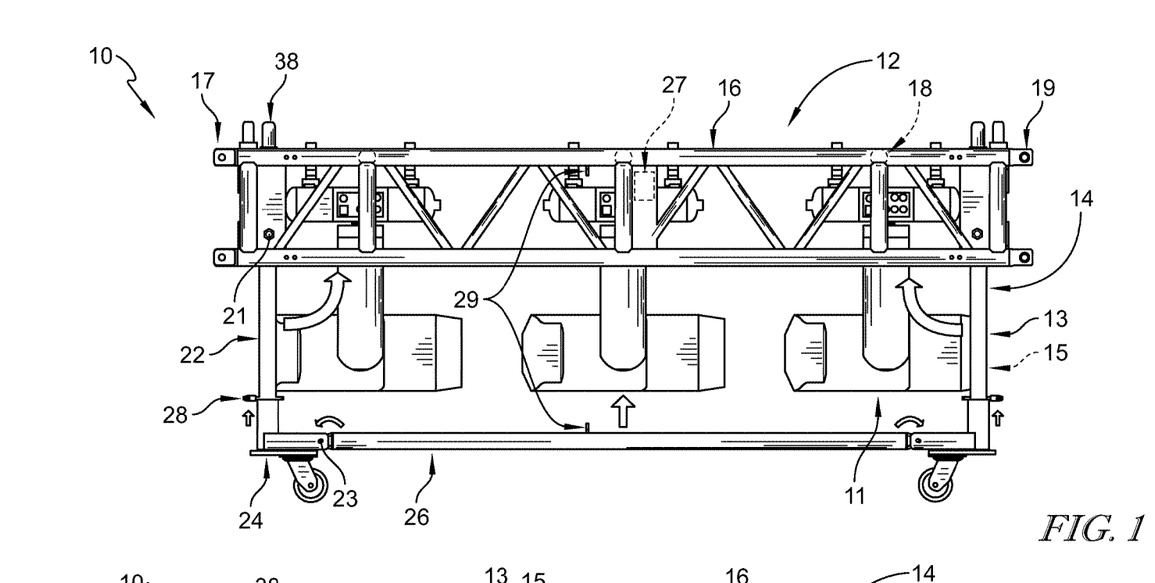
FIG. 1 is a front elevation view of an embodiment of an appliance-support system in accordance with the present disclosure showing that the appliance-support system includes a truss configured to support an appliance, illustratively shown as a light, and a rolling base shown in an expanded-use position to support the truss for transit and suggesting that the rolling base is configured to move from the expanded-use position to a collapsed-storage position where the rolling base is stored within the truss when not in use as shown in FIG. 2.
Figure 3:
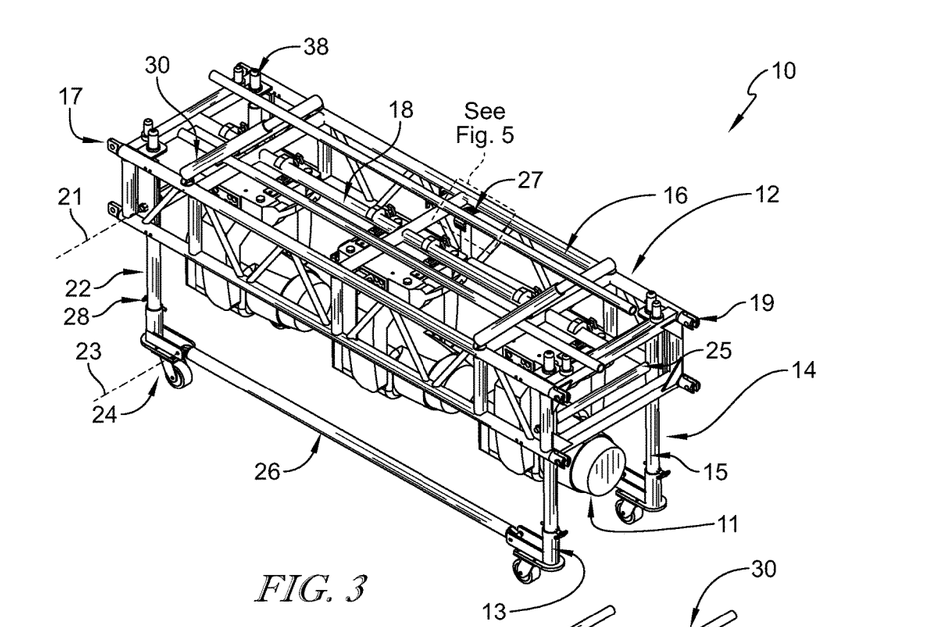
FIG. 3 is an upper perspective view of the appliance-support system of FIG. 1 showing that the rolling base includes a pair of support frames extending along opposing lower edges of the truss and suggesting that the support frames are spaced apart from appliances attached to the truss such that the rolling base can move between the expanded-use and collapsed-storage positions while the appliances are attached to the truss.

An illustrative appliance-support system 10 in accordance with the present disclosure is shown in FIG. 1. The appliance-support system 10 includes a truss 12 and a rolling base 14 coupled to the truss 12. The truss 12 includes an outer frame 16 and a plurality of cross bars 18 coupled to the outer frame 16 and configured to support appliances 11, such as a light, speaker, or other device used during stage performances or events, as shown in FIG. 3. The rolling base 14 is configured to support the truss 12 and appliances 11 above a ground level for transport between locations in an expanded-use position.

Figure 2:
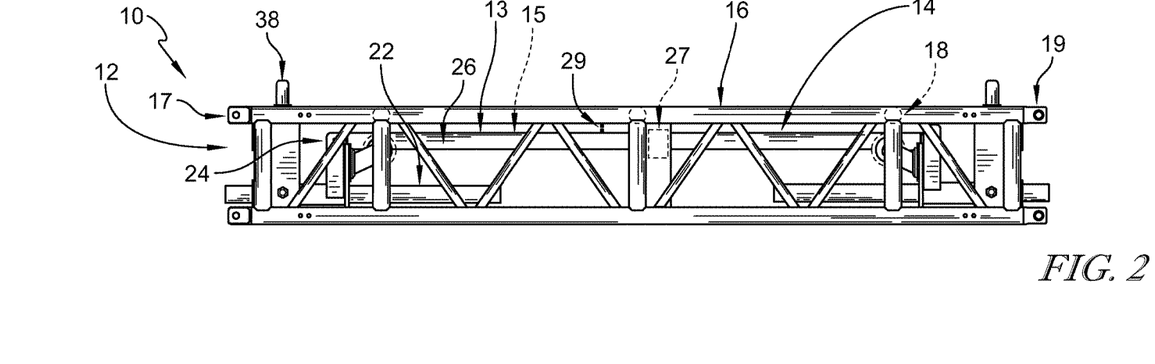
FIG. 2 is a similar view to FIG. 1 showing the rolling base in the collapsed-storage position and suggesting that the rolling base substantially fits within a boundary defined by the truss when in the collapsed-storage position.

The appliance-support system 10 is configured to be connected with other appliance-support systems 10 for forming a scaffolding to support the appliances 11 above an event stage, for example. The truss 12 of each appliance-support system 10 includes a plurality of tabs 17 and a plurality of slots 19 configured to receive the tabs 17 of an adjacent truss 12 to hold the trusses 12 together using clips, pins, or other fasteners. As the appliance-support system 10 is lifted off of the ground level, the rolling base 14 is configured to move toward a collapsed-storage position where the rolling base 14 is stored substantially within a boundary defined by the truss 12 as suggested in FIGS. 1 and 2.

In the illustrative embodiment, the rolling base 14 includes a pair of support frames 13, 15 extending along opposing sides of the truss 12 as shown in FIG. 3. Each of the support frames 13, 15 includes a pair of legs 22 positioned at opposing ends of the truss 12, a pair of wheeled supports 24 coupled to the legs 22, and a connecting rod 26 extending between the wheeled supports 24. A spacer rod 25 is coupled between the support frames 13, 15 to space the support frames 13, 15 apart from one another and allow substantially simultaneous motion of the support frames 13, 15 together. The support frames 13, 15 are also spaced apart from the appliances 11 attached to the truss 12 so that the rolling base 14 can move between the expanded-use and collapsed-storage positions even when the appliances 11 are attached.

The legs 22 are configured to pivot relative to the truss 12 about a pivot axis 21 as suggested in FIG. 3. The wheeled supports 24 are configured to pivot relative to the connecting rod 26 about a pivot axis 23. The wheeled supports 24 slide along the legs 22 as the rolling base 14 moves between the expanded-use and collapsed-storage positions as suggested in FIGS. 1 and 2.

Retainer clips 28 engage with the legs 22 and wheeled supports 24 to maintain the rolling base 14 in the expanded-use position as suggested in FIG. 1. A user removes the retainer clips 28 to allow the wheeled supports 24 to slide along the legs 22 and move the rolling base 14 from the expanded-use position to the collapsed-storage position. In the illustrative embodiment, a latch 27 is configured to engage with the connecting rod 26 to hold the rolling base 14 in the collapsed-storage position at the selection of a user as suggested in FIGS. 4 and 5. The latch 27 includes a hook 42 configured to receive the connecting rod 26 and a catch 44 configured to rotate relative to the hook 42 at the selection of a user to hold the connecting rod 26 in the hook 42. In some embodiments, a lock 29 is coupled to the truss 12 and rolling base 14 to hold the rolling base 14 in the collapsed-storage position using a clip, pin, or other fastener at the selection of a user in addition or alternatively to the latch 27 as suggested in FIGS. 1 and 2.

Figure 4:
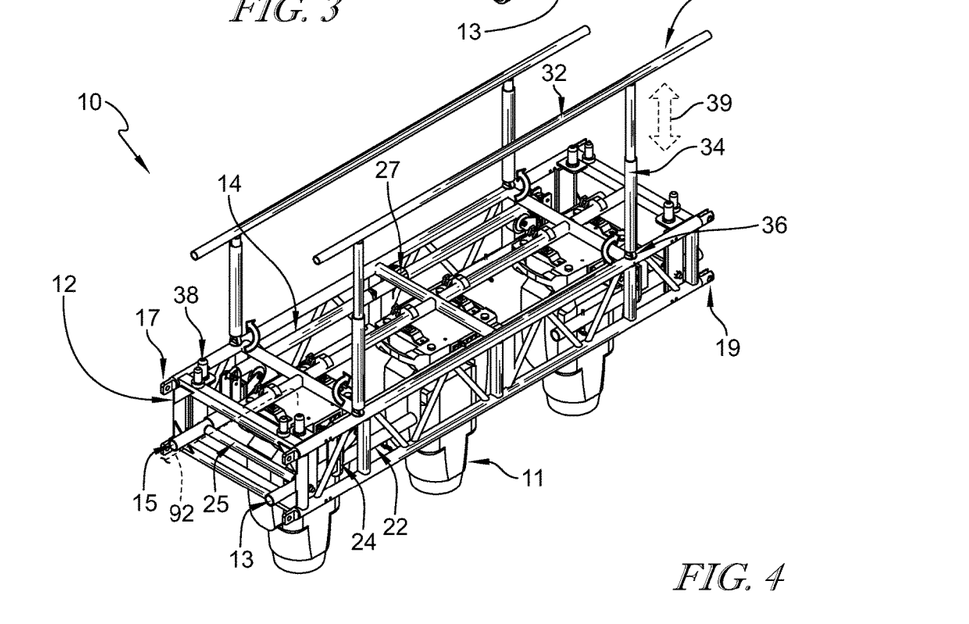
FIG. 4 is a view similar to FIG. 3 showing telescoping handrails attached along opposing upper edges of the truss and suggesting that the handrails move from a folded position to an unfolded position to allow an upper portion of the truss to act as a catwalk.
Figure 5:
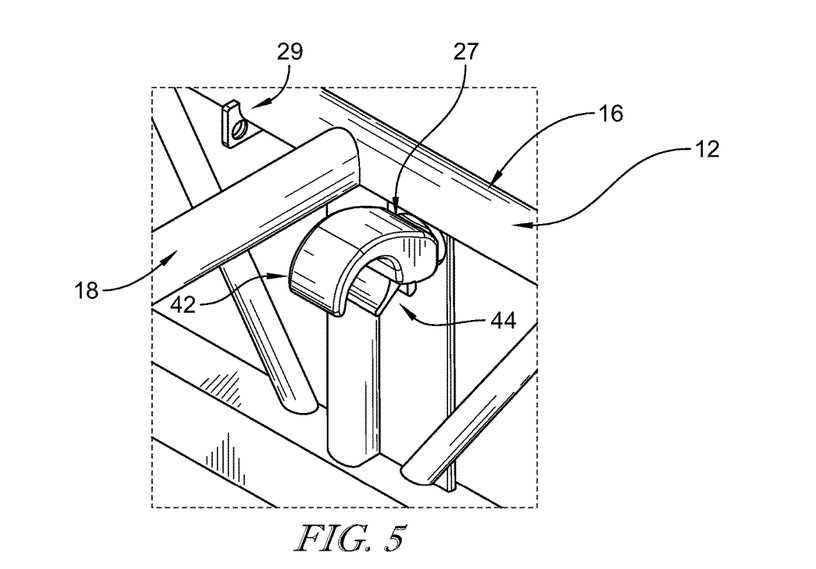
FIG. 5 is an enlarged view of FIG. 4 showing a locking hook configured to engage with the rolling base to hold the rolling base in the collapsed-storage position at the selection of a user.

In the illustrative embodiment, a pair of telescoping handrails 30 are coupled to the truss 12 and extend along opposing upper edges thereof as shown in FIG. 4. Each of the telescoping handrails 30 includes a rail portion 32 and a pivot portion 34. The rail portion 32 is configured to telescope relative to the pivot portion 34 as suggested by arrow 39. The pivot portion 34 is coupled to a pivot base 36 of the truss 12 and is configured to allow the handrail 30 to pivot relative to the truss 12 from a position extending toward the opposing handrail 30 and a position extending upward from the truss 12. Clips, pins, locks, or other devices can be used to secure the handrails 30 in the various positions described above.

Figure 6:
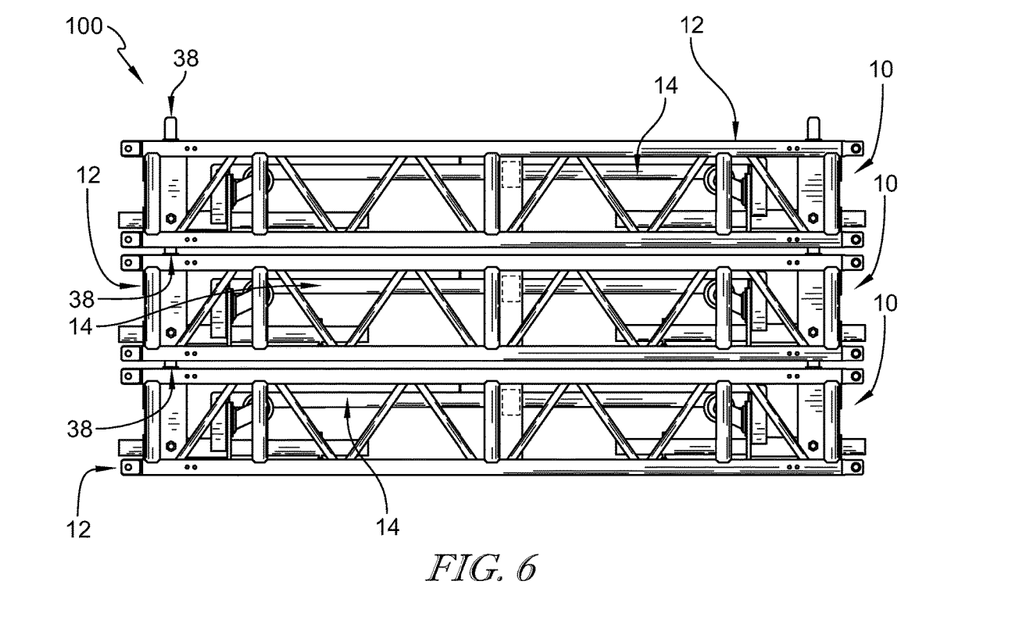
FIG. 6 is a front elevation view of a stack of appliance-support systems each having a rolling base in the collapsed-storage position such that stacking pins included on upper portions of the trusses engage with an adjacent upper appliance-support system in the stack of appliance-support systems to maintain alignment of the appliance-support systems.
Figure 7:
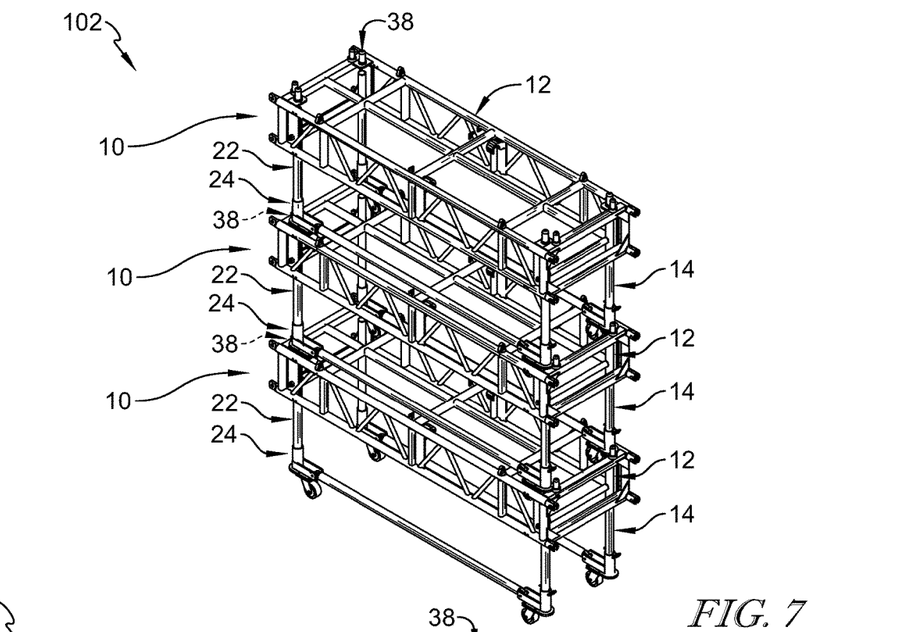
FIG. 7 is an upper perspective view of a stack of appliance-support systems each having a rolling base in the expanded-use position such that the stacking pins included on upper portions of the trusses engage with the rolling base of an adjacent upper appliance-support system in the stack of appliance-support systems to maintain alignment of the appliance-support systems.
Figure 8:
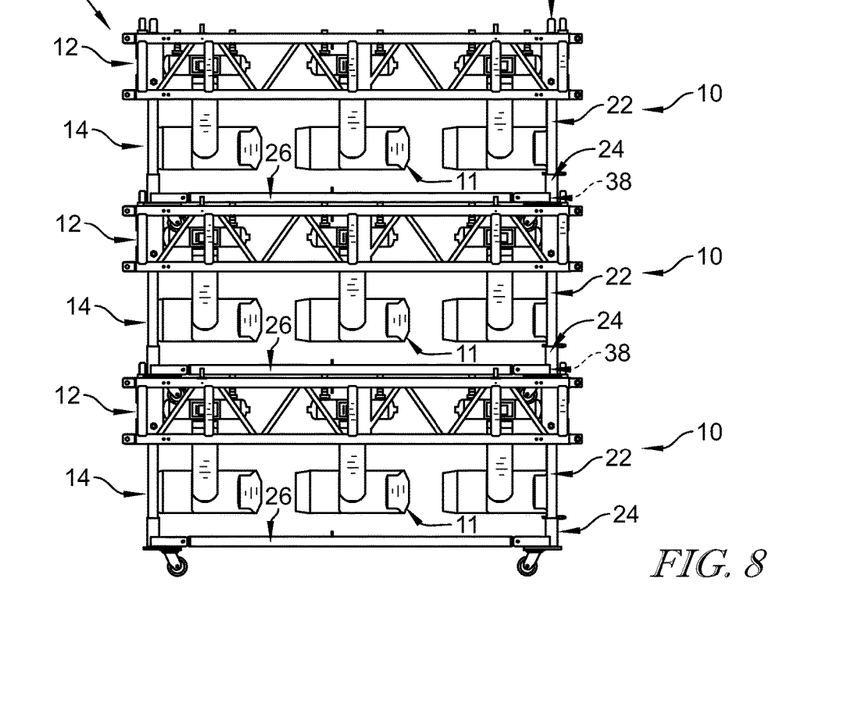
FIG. 8 is a front elevation view of the stack of appliance-support systems of FIG. 7 showing that appliances attached to the trusses are spaced apart from adjacent lower appliance-support systems in the stack of appliance-support systems.

Stacking pins 38 coupled to an upper portion of the truss 12 are configured to allow stacking of a plurality of appliance-support systems 10 relative to one another as suggested in FIGS. 6-8. With the rolling bases 14 in the collapsed-storage position and appliances 11 detached, a stack 100 of appliance-support systems 10 is formed by engaging the stacking pins 38 with an upper appliance-support system 10 in the stack 100 as suggested in FIG. 6. The stacking pins 38 block the upper appliance-support system 10 from sliding off of the lower appliance-support system 10 in the stack 100. The stacking pins 38 are also configured to block wires 92 used to power the appliances 11 from sliding off of the truss 12 as suggested in FIG. 3.

With the rolling bases 14 in the expanded-use position, a stack 102 of appliance-support systems 10 is formed by engaging the stacking pins 38 with the wheeled supports 24 of an upper appliance-support system 10 in the stack 102 as suggested in FIGS. 7 and 8. The stacking pins 38 block the upper appliance-support system 10 from sliding off of the lower appliance-support system 10 in the stack 102. In this configuration, the appliances 11 can be detached from the appliance-support systems 10, as suggested in FIG. 7, or attached, as suggested in FIG. 8, while still allowing the appliance-support systems 10 to be stacked.

The illustrative appliance-support system 10 allows the rolling base to be retained on the truss 12 and eliminates the need for separate storage of the rolling base 14 from the truss 12 while the appliance-support system 10 is in use.

Figure 9:
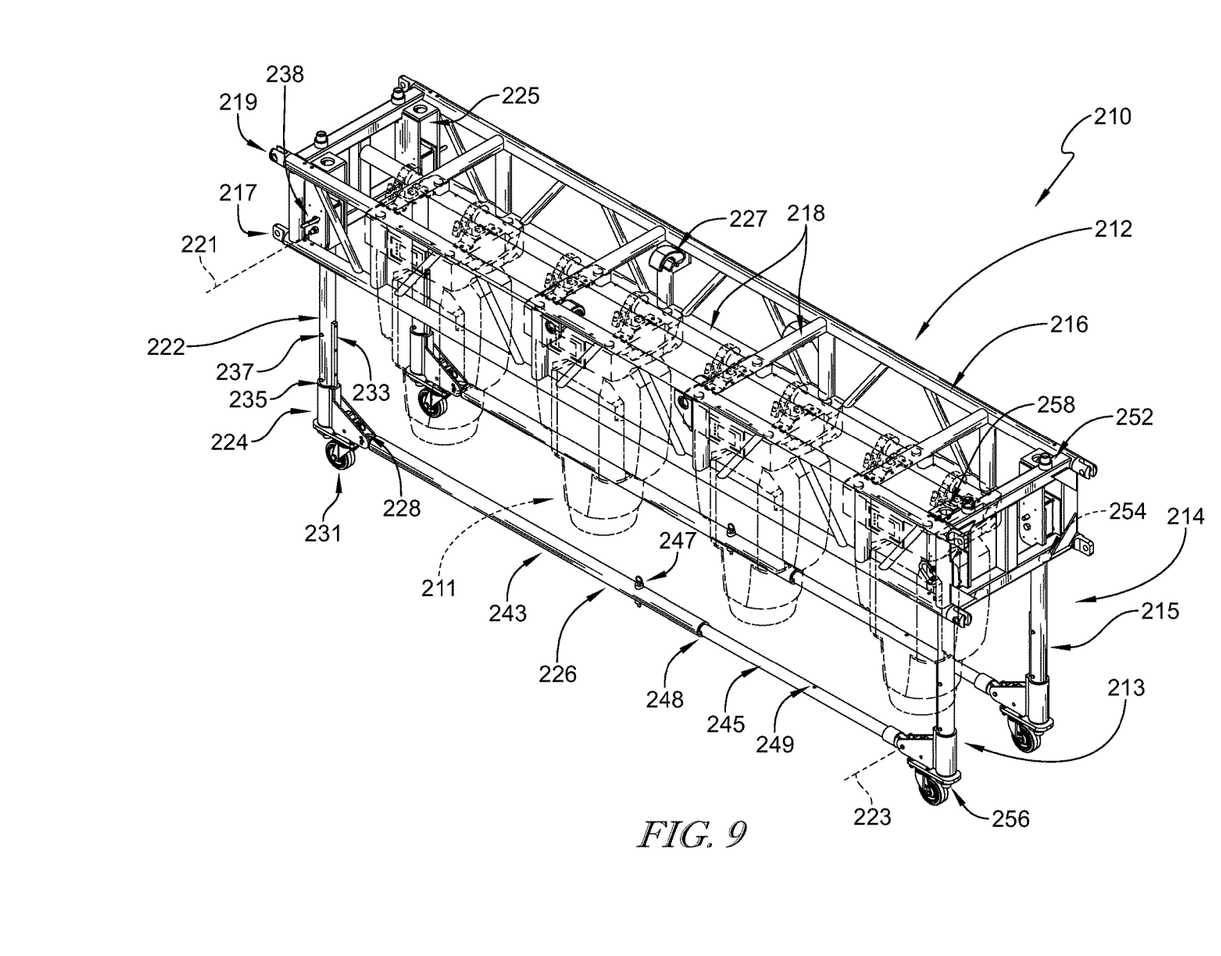
FIG. 9 is an upper perspective view of another embodiment of an appliance-support system in accordance with the present disclosure showing that the appliance-support system includes a truss configured to support an appliance, illustratively shown as a light, and a rolling base shown in an expanded-use position to support the truss for transit and suggesting that the rolling base is configured to move from the expanded-use position to a collapsed-storage position where the rolling base is stored within the truss when not in use as shown in FIG. 10.
Figure 10:
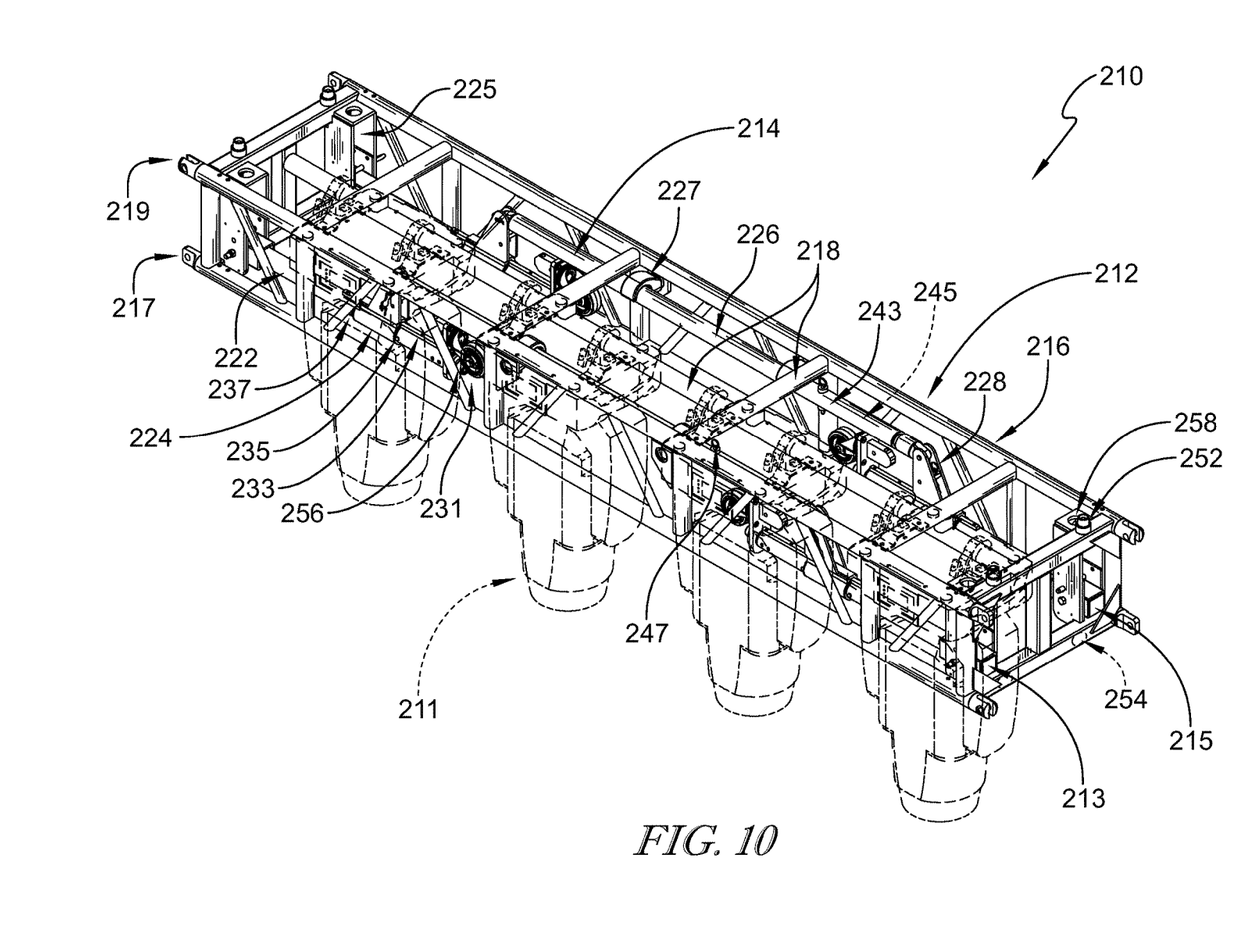
FIG. 10 is a similar view to FIG. 9 showing the rolling base in the collapsed-storage position and suggesting that the rolling base substantially fits within a boundary defined by the truss when in the collapsed-storage position.

Another embodiment of an illustrative appliance-support system 210 in accordance with the present disclosure is shown in FIG. 9. The appliance-support system 210 includes a truss 212 and a rolling base 214 coupled to the truss 212. The truss 212 includes an outer frame 216 and a plurality of cross bars 218 coupled to the outer frame 216 and configured to support appliances 211 (shown in phantom), such as a light, speaker, or other device used during stage performances or events, as suggested in FIG. 10. The rolling base 214 is configured to support the truss 212 and appliances 211 above a ground level for transport between locations in an expanded-use position as suggested in FIG. 9.

The appliance-support system 210 is configured to be connected with other appliance-support systems 210 for forming a scaffolding to support the appliances 211 above an event stage, for example. The truss 212 of each appliance-support system 210 includes a plurality of tabs 217 and a plurality of slots 219 configured to receive the tabs 217 of an adjacent truss 212 to hold the trusses 212 together using clips, pins, or other fasteners. As the appliance-support system 210 is lifted off of the ground level, the rolling base 214 is configured to move toward a collapsed-storage position where the rolling base 214 is stored substantially within a boundary defined by the truss 212 as suggested in FIGS. 9 and 10.

In the illustrative embodiment, the rolling base 214 includes a pair of support frames 213, 215 extending along opposing sides of the truss 212 as shown in FIG. 9. Each of the support frames 213, 215 includes a pair of legs 222 positioned at opposing ends of the truss 212, a pair of sliders 224 coupled to the legs 222, and a connecting rod 226 extending between the sliders 224. A wheeled support 231 is coupled to a distal end of each leg 222 to support the appliance-support system 210 for rolling movement along the ground. The support frames 213, 215 are also spaced apart from the appliances 211 attached to the truss 212 so that the rolling base 214 can move between the expanded-use and collapsed-storage positions even when the appliances 211 are attached.

Each leg 222 is coupled to a mount block 225 for rotation about a pivot axis 221 relative to the truss 212 as suggested in FIG. 9. The sliders 224 are configured to pivot relative to the connecting rod 226 about a pivot axis 223. The sliders 224 slide along the legs 222 as the rolling base 214 moves between the expanded-use and collapsed-storage positions as suggested in FIGS. 9 and 10. A keyway 233 coupled to each leg 222 blocks rotation of slider 224 relative to the leg 222 to allow for smooth sliding motion of the slider 224.

Pull locks 228 carried on sliders 224 engage with the wheeled supports 231 to maintain the rolling base 214 in the expanded-use position as suggested in FIG. 9. A user releases the pull locks 228 to allow the sliders 224 to slide along the legs 222 and move the rolling base 214 from the expanded-use position to the collapsed-storage position. In some embodiments, one or more snap buttons 235, 237 can be used to control movement of the sliders 224 on the legs 222. Pull pins 238 engage with mount blocks 225 and legs 222 to control rotation of legs 222 relative to truss 212.

In the illustrative embodiment, the connecting rod 226 includes an outer tube 243 and an inner tube 245 which telescopes relative to outer tube 243 as suggested in FIG. 9.

In the expanded-use position, a snap button 248 blocks inner tube 245 from moving into outer tube 243. A pull pin 247 can also block movement of inner tube 245 into outer tube 243. In the collapsed-storage position, the inner tube 245 is received in outer tube 243 and pull pin 247 is received in pin hole 249 to block inner tube 245 from telescoping out from outer tube 243. One or more latches 227 are configured to engage with the connecting rod 226 to hold the rolling base 214 in the collapsed-storage position at the selection of a user as suggested in FIGS. 9 and 10.

Stacking pins 252 coupled to an upper portion of the truss 212 are configured to allow stacking of a plurality of appliance-support systems 210 relative to one another as suggested in FIG. 9. With the rolling bases 214 in the collapsed-storage position and appliances 211 detached, a stack of appliance-support systems 210 is formed by engaging the stacking pins 252 with pin holes 254 of an upper appliance-support system 210 in the stack as suggested in FIG. 9. The stacking pins 252 block the upper appliance-support system 210 from sliding off of the lower appliance-support system 210 in the stack. The stacking pins 252 are also configured to block wires used to power the appliances 211 from sliding off of the truss 212.

With the rolling bases 214 in the expanded-use position, a stack of appliance-support systems 210 is formed by engaging the stacking pins 256 coupled to wheeled supports 231 with pin holes 258 of a lower appliance-support system 210 in the stack as suggested in FIG. 9. The stacking pins 256 block the upper appliance-support system 210 from sliding off of the lower appliance-support system 210 in the stack. In this configuration, the appliances 211 can be either attached or detached from the appliance-support systems 210 while still allowing the appliance-support systems 210 to be stacked.

The illustrative appliance-support system 210 allows the rolling base to be retained on the truss 212 and eliminates the need for separate storage of the rolling base 214 from the truss 212 while the appliance-support system 210 is in use. In some embodiments, a pair of telescoping handrails can be coupled to the truss 212 to extend along opposing upper edges thereof. The handrails can pivot relative to the truss 212 to allow a pathway to be formed along a top of the truss 212.

Figure 11:
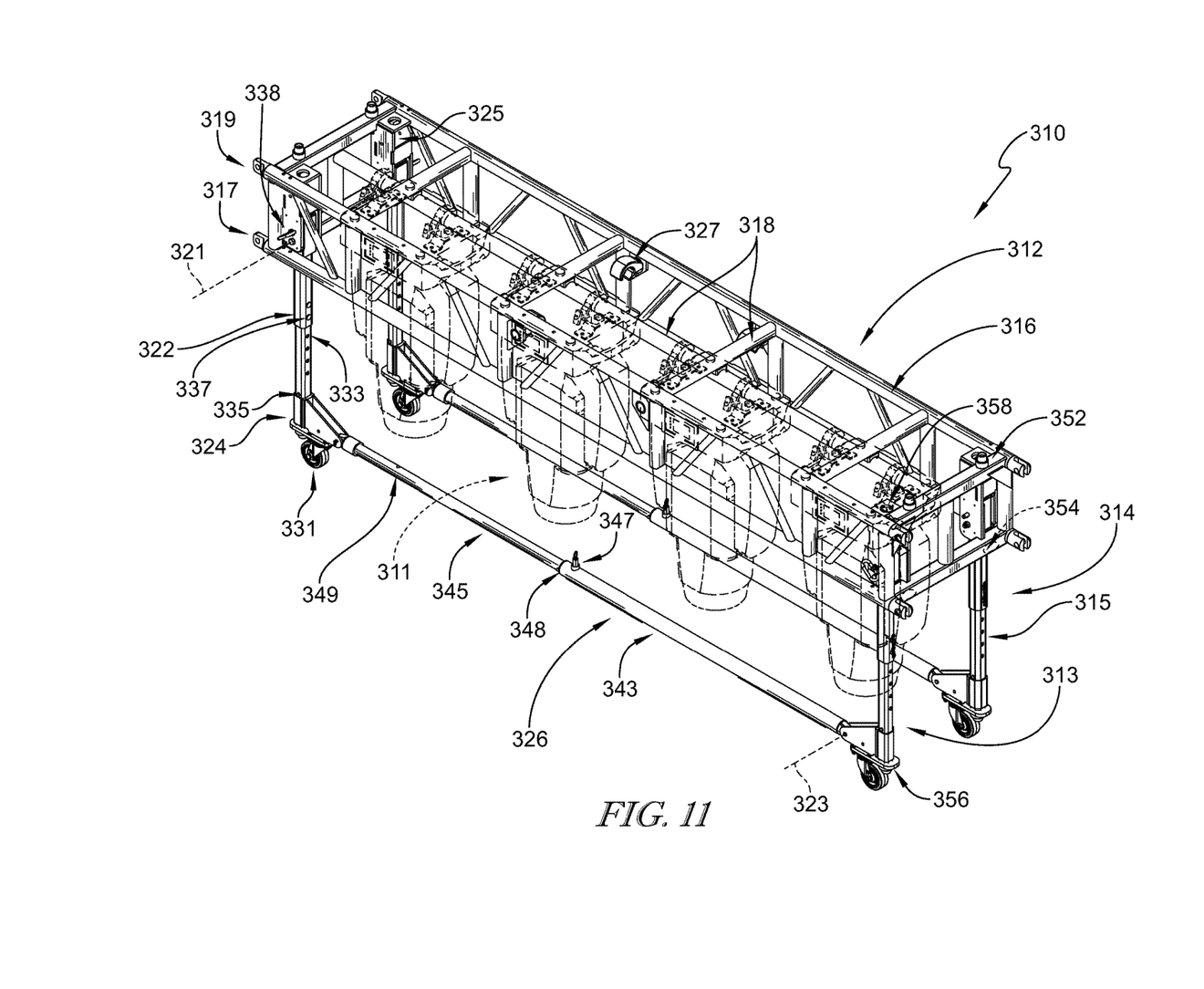
FIG. 11 is an upper perspective view of another embodiment of an appliance-support system in accordance with the present disclosure showing that the appliance-support system includes a truss configured to support an appliance, illustratively shown as a light, and a rolling base shown in an expanded-use position to support the truss for transit and suggesting that the rolling base is configured to move from the expanded-use position to a collapsed-storage position where the rolling base is stored within the truss when not in use as shown in FIG. 12.

Another embodiment of an illustrative appliance-support system 310 in accordance with the present disclosure is shown in FIG. 11. The appliance-support system 310 includes a truss 312 and a rolling base 314 coupled to the truss 312. The truss 312 includes an outer frame 316 and a plurality of cross bars 318 coupled to the outer frame 316 and configured to support appliances 311 (shown in phantom), such as a light, speaker, or other device used during stage performances or events, as suggested in FIG. 12. The rolling base 314 is configured to support the truss 312 and appliances 311 above a ground level for transport between locations in an expanded-use position as suggested in FIG. 11.

The appliance-support system 310 is configured to be connected with other appliance-support systems 310 for forming a scaffolding to support the appliances 311 above an event stage, for example. The truss 312 of each appliance-support system 310 includes a plurality of tabs 317 and a plurality of slots 319 configured to receive the tabs 317 of an adjacent truss 312 to hold the trusses 312 together using clips, pins, or other fasteners. As the appliance-support system 310 is lifted off of the ground level, the rolling base 314 is configured to move toward a collapsed-storage position where the rolling base 314 is stored substantially within a boundary defined by the truss 312 as suggested in FIGS. 11 and 12.

In the illustrative embodiment, the rolling base 314 includes a pair of support frames 313, 315 extending along opposing sides of the truss 312 as shown in FIG. 11. Each of the support frames 313, 315 includes a pair of legs 322 positioned at opposing ends of the truss 312, a pair of sliders 324 coupled to the legs 322, and a connecting rod 326 extending between the sliders 324. A wheeled support 331 is coupled to a distal end of each leg 322 to support the appliance-support system 310 for rolling movement along the ground. The support frames 313, 315 are also spaced apart from the appliances 311 attached to the truss 312 so that the rolling base 314 can move between the expanded-use and collapsed-storage positions even when the appliances 311 are attached.

Each leg 322 is coupled to a mount block 325 for rotation about a pivot axis 321 relative to the truss 312 as suggested in FIG. 11. The sliders 324 are configured to pivot relative to the connecting rod 326 about a pivot axis 323. The sliders 324 slide along the legs 322 as the rolling base 314 moves between the expanded-use and collapsed-storage positions as suggested in FIGS. 11 and 12. In the illustrative embodiment, legs 322 are formed as substantially rectangular tubes to block rotation of slider 324 relative to the leg 322 to allow for smooth sliding motion of the slider 324.

One or more snap buttons 335 can be used to control movement of the sliders 324 on the legs 322 to maintain the rolling base 314 in the expanded-use position as suggested in FIG. 11. A user releases the snap button 335 to allow the sliders 324 to slide along the legs 322 and move the rolling base 314 from the expanded-use position to the collapsed-storage position. Pull pins 338 engage with mount blocks 325 and legs 322 to control rotation of legs 322 relative to truss 312. In the illustrative embodiment, the legs 322 are telescopic to adjust a length of the legs 322 and thereby a height of the truss 312 above a ground level when the rolling base 314 is in the expanded-use position. Detents 337, such as pins, engage with holes 333 to allow a user to adjust the length of the legs 322.

The connecting rod 326 includes an outer tube 343 and an inner tube 345 which telescopes relative to outer tube 343 as suggested in FIG. 11. In the expanded-use position, a snap button 348 blocks inner tube 345 from moving into outer tube 343. A pull pin 347 can also block movement of inner tube 345 into outer tube 343. In the collapsed-storage position, the inner tube 345 is received in outer tube 343 and pull pin 347 is received in pin hole 349 to block inner tube 345 from telescoping out from outer tube 343. One or more latches 327 are configured to engage with the connecting rod 326 to hold the rolling base 314 in the collapsed-storage position at the selection of a user as suggested in FIGS. 11 and 12.

Figure 12:
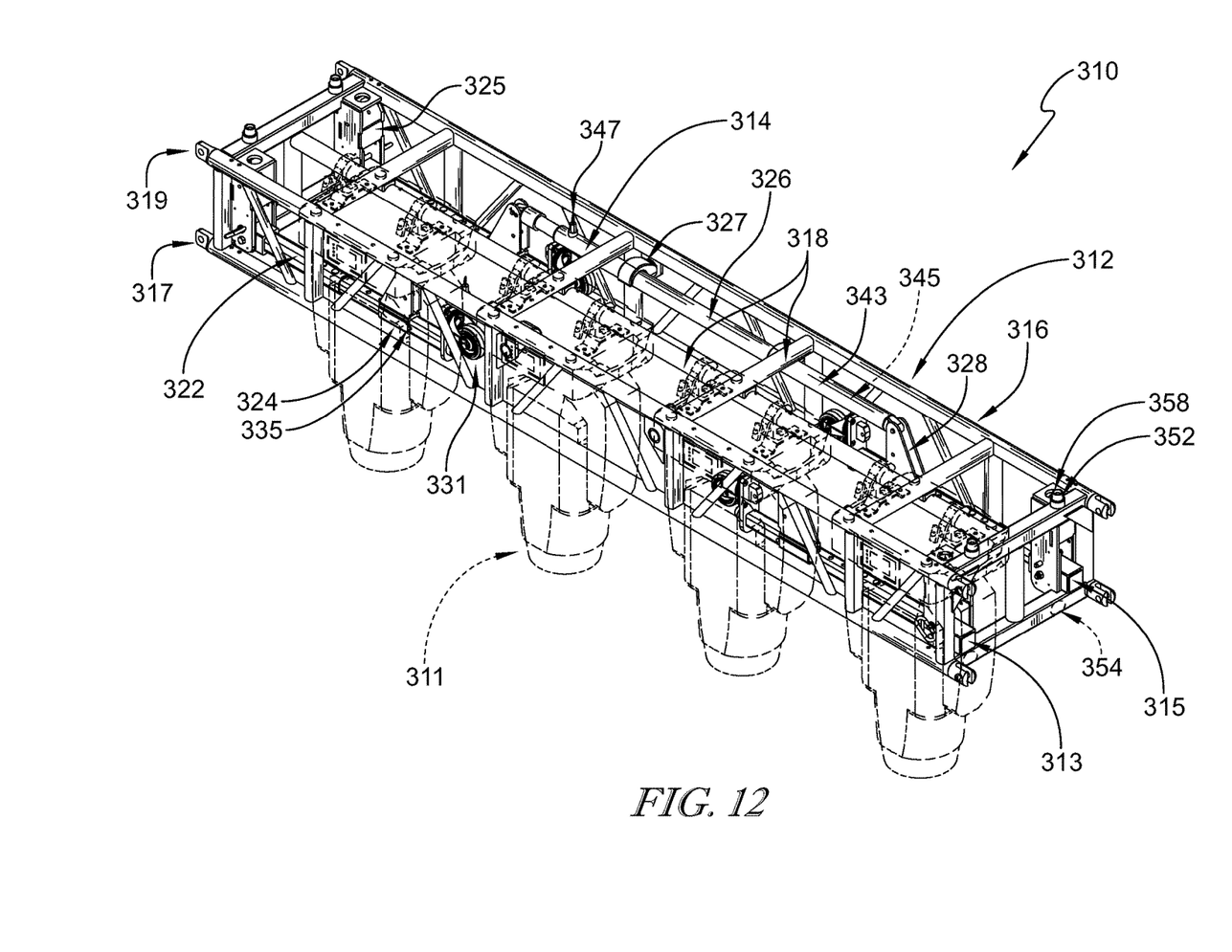
FIG. 12 is a similar view to FIG. 11 showing the rolling base in the collapsed-storage position and suggesting that the rolling base substantially fits within a boundary defined by the truss when in the collapsed-storage position.

Stacking pins 352 coupled to an upper portion of the truss 312 are configured to allow stacking of a plurality of appliance-support systems 310 relative to one another as suggested in FIG. 12. With the rolling bases 314 in the collapsed-storage position and appliances 311 detached, a stack of appliance-support systems 310 is formed by engaging the stacking pins 352 with pin holes 354 of an upper appliance-support system 310 in the stack as suggested in FIG. 12. The stacking pins 352 block the upper appliance-support system 310 from sliding off of the lower appliance-support system 310 in the stack. The stacking pins 352 are also configured to block wires used to power the appliances 311 from sliding off of the truss 312.

With the rolling bases 314 in the expanded-use position, a stack of appliance-support systems 310 is formed by engaging the stacking pins 356 coupled to wheeled supports 331 with pin holes 358 of a lower appliance-support system 310 in the stack as suggested in FIG. 11. The stacking pins 356 block the upper appliance-support system 310 from sliding 3ff of the lower appliance-support system 310 in the stack. In this configuration, the appliances 311 can be either attached or detached from the appliance-support systems 310 while still allowing the appliance-support systems 310 to be stacked.

The illustrative appliance-support system 310 allows the rolling base to be retained on the truss 312 and eliminates the need for separate storage of the rolling base 314 from the truss 312 while the appliance-support system 310 is in use. In some embodiments, a pair of telescoping handrails can be coupled to the truss 312 to extend along opposing upper edges thereof. The handrails can pivot relative to the truss 312 to allow a pathway to be formed along a top of the truss 312.

Figure 13:
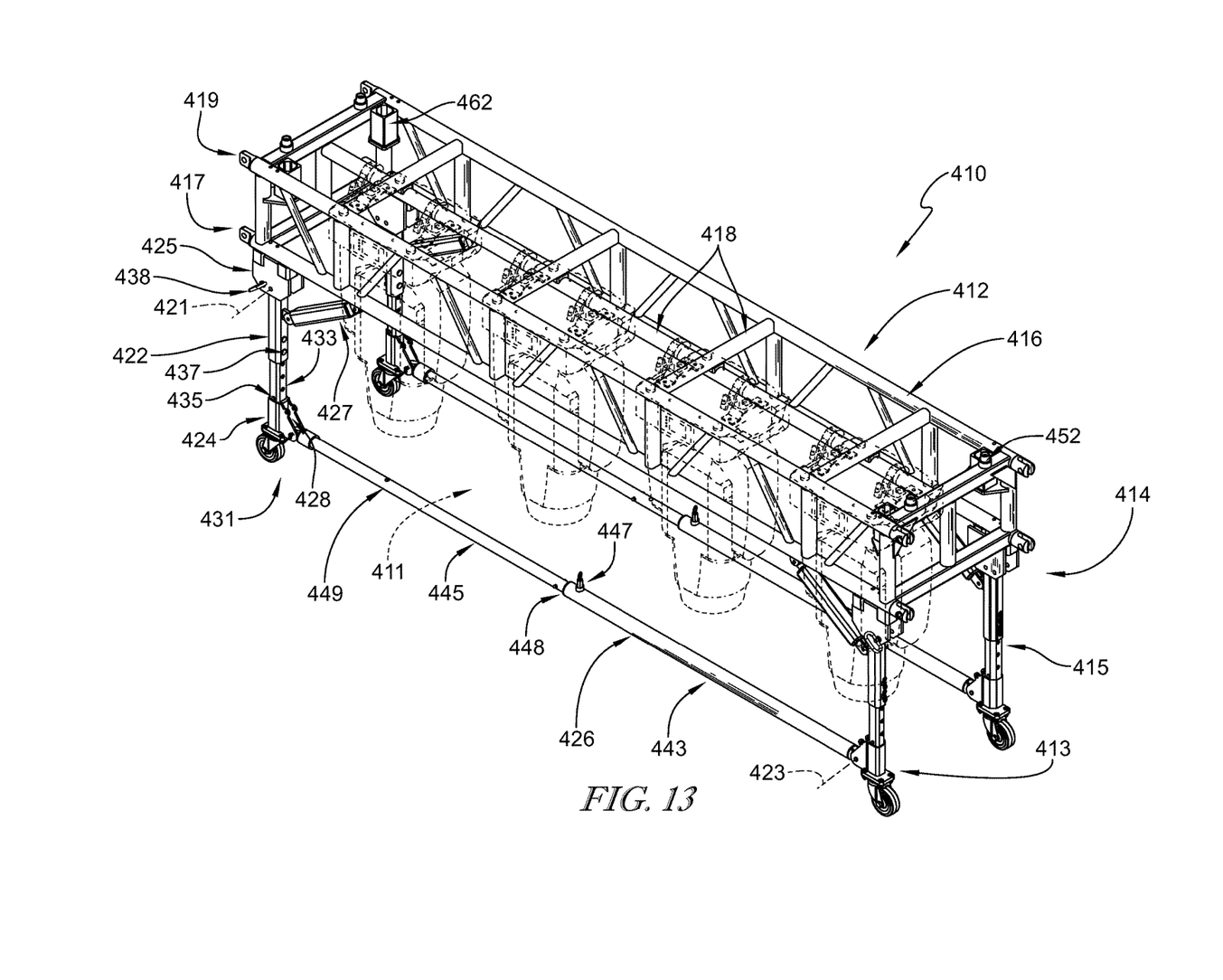
FIG. 13 is an upper perspective view of another embodiment of an appliance-support system in accordance with the present disclosure showing that the appliance-support system includes a truss configured to support an appliance, illustratively shown as a light, and a rolling base shown in an expanded-use position to support the truss for transit and suggesting that the rolling base is configured to move from the expanded-use position to a collapsed-storage position where the rolling base is stored along an underside of the truss when not in use as shown in FIG. 14.

Another embodiment of an illustrative appliance-support system 410 in accordance with the present disclosure is shown in FIG. 13. The appliance-support system 410 includes a truss 412 and a rolling base 414 coupled to the truss 412. The truss 412 includes an outer frame 416 and a plurality of cross bars 418 coupled to the outer frame 416 and configured to support appliances 411 (shown in phantom), such as a light, speaker, or other device used during stage performances or events, as suggested in FIG. 13. The rolling base 414 is configured to support the truss 412 and appliances 411 above a ground level for transport between locations in an expanded-use position as suggested in FIG. 13.

The appliance-support system 410 is configured to be connected with other appliance-support systems 410 for forming a scaffolding to support the appliances 411 above an event stage, for example. The truss 412 of each appliance-support system 410 includes a plurality of tabs 417 and a plurality of slots 419 configured to receive the tabs 417 of an adjacent truss 412 to hold the trusses 412 together using clips, pins, or other fasteners. As the appliance-support system 410 is lifted off of the ground level, the rolling base 414 is configured to move toward a collapsed-storage position where the rolling base 414 is stored along an underside of the truss 412 as suggested in FIGS. 13 and 14.

In the illustrative embodiment, the rolling base 414 includes a pair of support frames 413, 415 extending along opposing sides of the truss 412 as shown in FIG. 11. Each of the support frames 413, 315 includes a pair of legs 422 positioned at opposing ends of the truss 412, a pair of sliders 424 coupled to the legs 422, and a connecting rod 426 extending between the sliders 424. A wheeled support 431 is coupled to a distal end of each leg 422 to support the appliance-support system 410 for rolling movement along the ground. The support frames 413, 415 are also spaced apart from the appliances 411 attached to the truss 412 so that the rolling base 414 can move between the expanded-use and collapsed-storage positions even when the appliances 411 are attached.

Each leg 422 is coupled to a mount block 425 for rotation about a pivot axis 421 relative to the truss 412 as suggested in FIG. 13. The sliders 424 are configured to pivot relative to the connecting rod 426 about a pivot axis 423. The sliders 424 slide along the legs 422 as the rolling base 414 moves between the expanded-use and collapsed-storage positions as suggested in FIGS. 13 and 14. In the illustrative embodiment, legs 422 are formed as substantially rectangular tubes to block rotation of slider 424 relative to the leg 422 to allow for smooth sliding motion of the slider 424.

One or more snap buttons 435 can be used to control movement of the sliders 424 on the legs 422 to maintain the rolling base 414 in the expanded-use position as suggested in FIG. 13. In the illustrative embodiment, braces 427 are coupled to frame 416 and to legs 422 to support rolling base 414 in the expanded-use position. A user disconnects at least one end of brace 427, for example by removing a pin from the end connected to frame 416 as suggested in FIG. 14, and releases the snap button 435 to allow the sliders 424 to slide along the legs 422 and move the rolling base 414 from the expanded-use position to the collapsed-storage position. In some embodiments, one end of brace 427 is received in a slot 428 of the slider 424 when the rolling base 414 is in the collapsed-storage position as suggested in FIG. 14. The legs 422 are telescopic to adjust a length of the legs 422 and thereby a height of the truss 412 above a ground level when the rolling base 414 is in the expanded-use position as suggested in FIG. 13. Detents 437, such as pins, engage with holes 433 to allow a user to adjust the length of the legs 422.

The connecting rod 426 includes an outer tube 443 and an inner tube 445 which telescopes relative to outer tube 443 as suggested in FIG. 13. In the expanded-use position, a snap button 448 blocks inner tube 445 from moving into outer tube 443. A pull pin 447 can also block movement of inner tube 445 into outer tube 443. In the collapsed-storage position, the inner tube 445 is received in outer tube 443 and pull pin 447 is received in pin hole 449 to block inner tube 445 from telescoping out from outer tube 443. Pull pins 438 engage with mount blocks 425 and legs 422 to control rotation of legs 422 relative to truss 412 when the rolling base 414 is in the collapsed-storage position as suggested in FIGS. 13 and 14.

Figure 14:
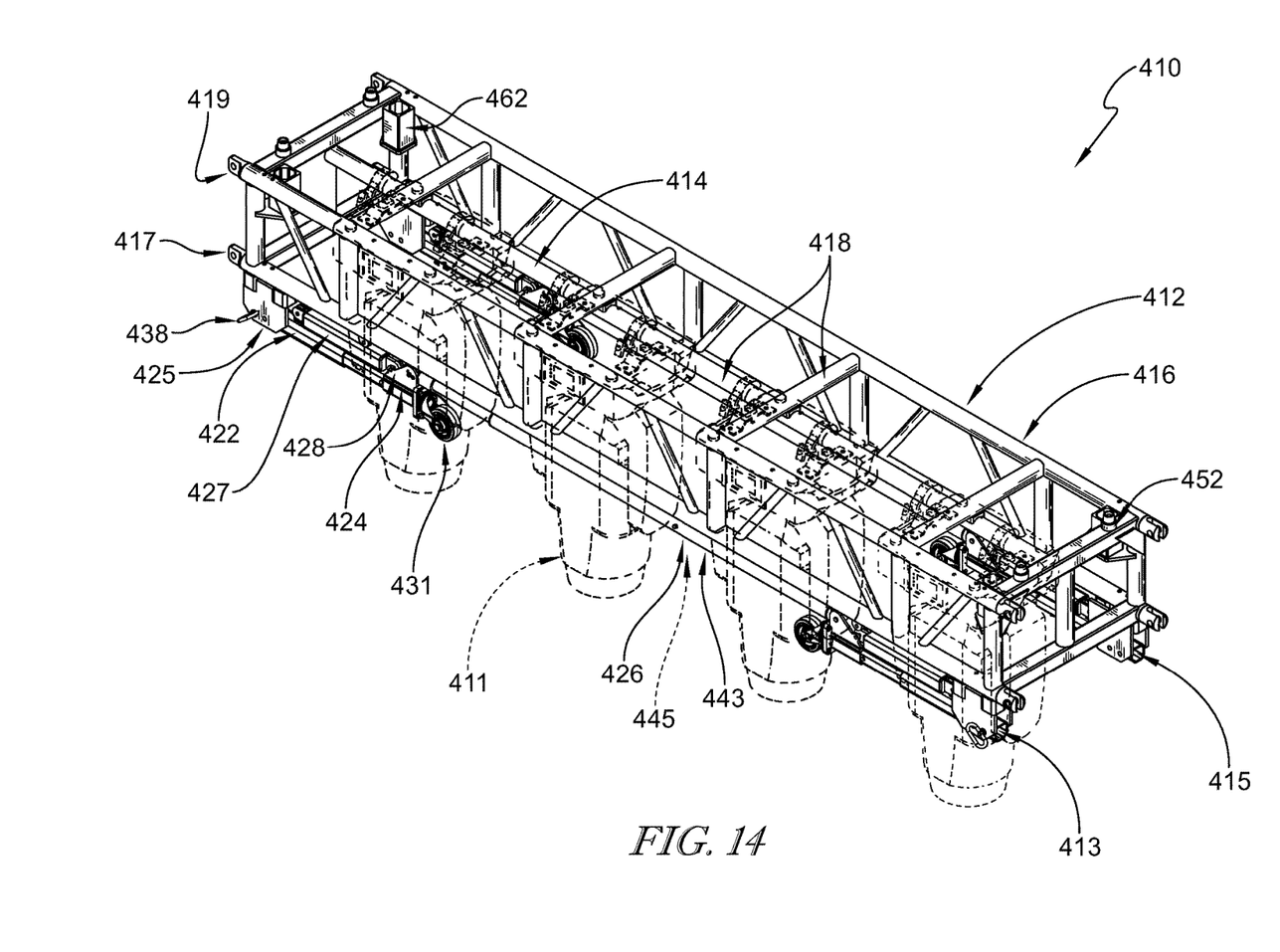
FIG. 14 is a similar view to FIG. 13 showing the rolling base in the collapsed-storage position and suggesting that the rolling base extends along an underside of the truss and is spaced apart from the appliances to allow use of the appliances.

Stacking pins 452 coupled to an upper portion of the truss 412 are configured to allow stacking of a plurality of appliance-support systems 410 relative to one another as suggested in FIG. 14. With the rolling bases 414 in the collapsed-storage position and appliances 411 detached, a stack of appliance-support systems 410 is formed by engaging the rolling base 414 with the frame 416 of a lower appliance-support system 410 in the stack as suggested in FIG. 14. The stacking pins 452 block the upper appliance-support system 410 from sliding off of the lower appliance-support system 410 in the stack. The stacking pins 452 are also configured to block wires used to power the appliances 411 from sliding off of the truss 412.

In some embodiments, a stack of appliance-support systems 410 is formed by engaging stacking pins coupled to the wheeled supports 431 with the sockets 462 or other structure of a lower appliance-support system 410 in the stack when the rolling base 414 is in the expanded-use position as suggested in FIG. 11. In this configuration, the appliances 411 can be either attached or detached from the appliance-support systems 410 while still allowing the appliance-support systems 410 to be stacked.

The illustrative appliance-support system 410 allows the rolling base to be retained on the truss 412 and eliminates the need for separate storage of the rolling base 414 from the truss 412 while the appliance-support system 410 is in use. In some embodiments, a pair of telescoping handrails can be coupled to the truss 412 to extend along opposing upper edges thereof. The handrails can pivot relative to the truss 412 to allow a pathway to be formed along a top of the truss 412.

Figures 15, 16:
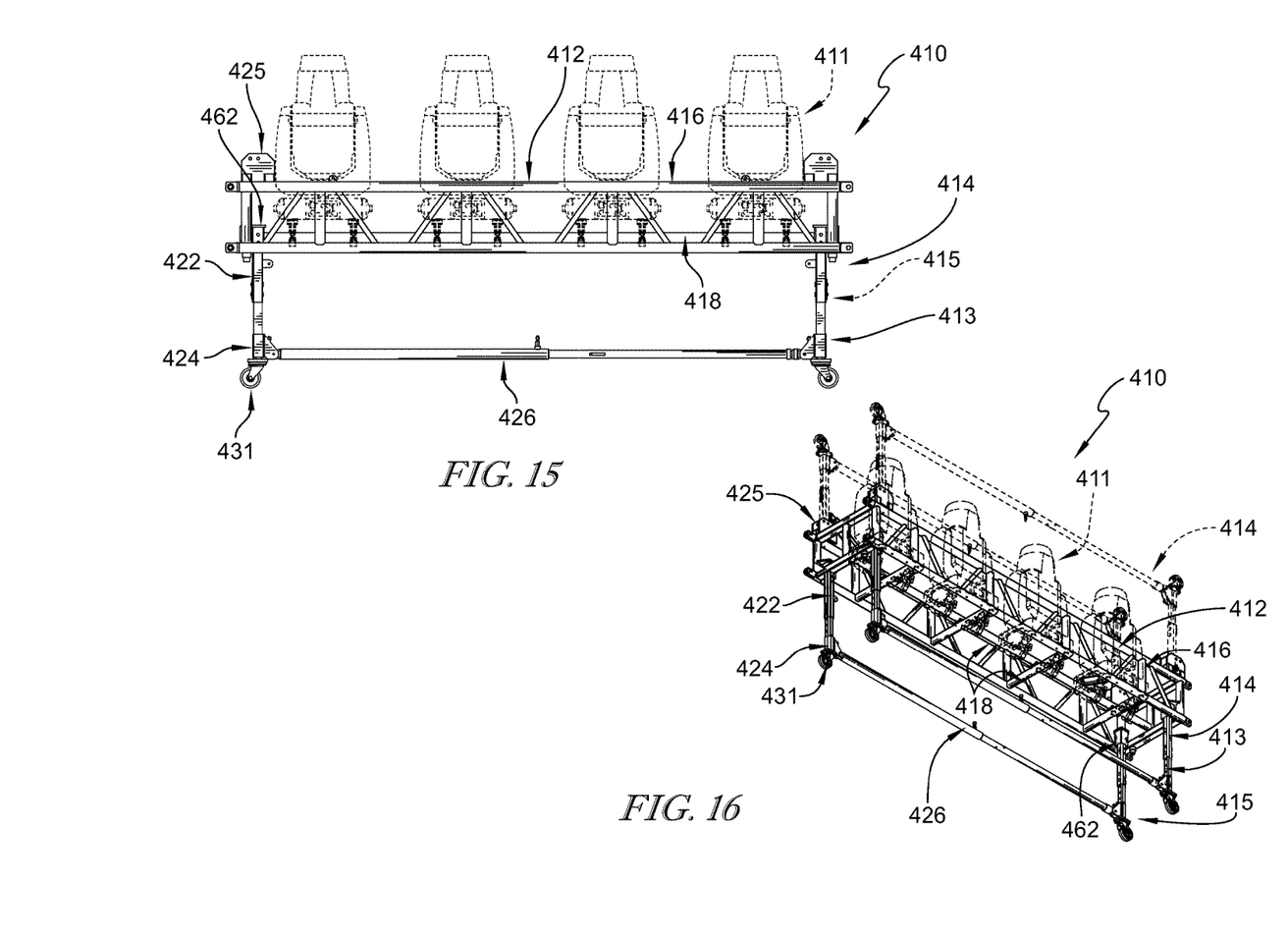
FIG. 15 is a side elevation view of the appliance-support system of FIG. 13 showing the rolling base attached to an opposite side of the truss such that the appliances point upward and suggesting that the rolling base supports the truss for movement along a ground level.
FIG. 16 is a lower perspective view of the appliance-support system of FIG. 15 showing the rolling base received in sockets of the truss to support the truss for rolling movement and suggesting that the rolling base is removed from the truss (originally shown in phantom) and inserted into the sockets.

Sockets 462 are coupled to truss 412 as shown in FIG. 13. In the illustrative embodiment, the frames 413, 415 are configured to be removed from the mount blocks 425, and the legs 422 are configured to be received in sockets 462 to support truss 412 in an overturned configuration such that the appliances 411 point upward as suggested in FIGS. 15 and 16. In the configuration of FIGS. 15 and 16, appliances 411, such as lights, can be used to project light upwards from a stage or sub-stage level, for example, while rolling base 414 supports truss 412. In some embodiments, braces 427, not shown in FIGS. 15 and 16, can be completely removed and stored separately from truss 412. In some embodiments, one end of braces 427 is disconnected from legs 422, and the other end remains connected to frame 416 such that the braces 427 are retained on truss 412.

In illustrative embodiments, the legs of the rolling base pivot into a stored position and do not have to be removed for storage separate from the truss. The truss and legs are self-contained with no carts, dollies, or other separate components to store.

In illustrative embodiments, the truss, legs, and wheels along with lights are all connected. The wheeled support slides up and down each individual leg. The wheeled support incorporates a locking pin to keep the legs locked into an extended position during use. The truss includes a snap hook locking device to grip the connecting rod in the stored position to allow the truss to be stored/stacked or used a play position (e.g., truss hung in the air with lights on). At the end of a show, a user can release the catch of the locking device and the legs extend downward for transportation.

In illustrative embodiments, each leg is supported with 1½ inch diameter tube with oil light flange bushings and UHMW with a ¾ inch pivot bar connected to the inside of each corner of the truss. The support bar is not welded to the legs.

In illustrative embodiments, the truss stacks with or without lights for storage with legs deployed or in fold up position. The truss includes cable management using the stacking pins on top of the truss. The trusses can be stacked with the legs tucked up inside. The stacking pins may be removable or interchangeable with different ones or to allow for handrails. The optional handrails fold over and flat to the top of the truss with a quick deployment locking device. The handrails may telescope for height likeness.

In illustrative embodiments, gliding elbows allow for each leg to be changed independently. The truss is configured to troop or transport intelligent lighting or fixed lighting or combinations of each. The truss may be 30 inches wide.

In illustrative embodiments, a crane or winch can be coupled to the truss of the appliance-support system. The appliance-support system can be configured to support 400 pounds or more. The rapid deployment of the appliance-support systems of the present disclosure is a benefit over present systems which require supporting bases of the trusses to be removed and stored. The appliance-support systems of the present disclosure can be moved to a collapsed-storage position and ready for use in just a few minutes because the rolling bases collapse into the truss without the need to be stored separately.

In illustrative embodiments, the trusses of the appliance-support systems can be different sizes to accommodate appliances of different sizes.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. An appliance-support system comprising
   a truss adapted to support an appliance, the truss having an outer frame and cross bars coupled to the outer frame, and
   a rolling base coupled to the truss, the rolling base including a first support frame extending along a first side of the truss and a second support frame extending along a second side of the truss opposite the first side, each of the first and second support frames including a pair of spaced apart legs, each leg having a proximal end coupled to the truss to allow pivoting movement of the leg relative to the truss and a distal end spaced apart from the proximal end,
   wherein the rolling base is movable relative to the truss between an expanded-use position where the first and second support frames extend downward from the truss and a collapsed-storage position where the first and second support frames are stored substantially within the outer frame, and the legs of the first support frame rotate toward one another and the legs of the second support from rotate toward one another with movement of the rolling base from the expanded-use position to the collapsed-storage position.

2. The system of claim 1, wherein each of the first and second support frames further includes
   a pair of wheeled supports, one of the wheeled supports coupled to the distal end of one leg of the pair of legs and the other wheeled support coupled to the distal end of the other leg of the pair of legs.

3. The system of claim 2, wherein each leg is configured for telescopic movement to adjust a length of the leg.

4. The system of claim 2, further comprising mount blocks coupled to the truss, and wherein the legs are coupled to the mount blocks for pivoting movement relative to the truss.

5. The system of claim 4, wherein the wheeled supports are configured to engage mount blocks of a secondary appliance-support system to form a stack of appliance-support systems when the rolling base is in the expanded-use position.

6. The system of claim 2, wherein each of the first and second support frames further includes:
   a pair of sliders, one slider coupled to one leg of the pair of legs and the other slider coupled to the other leg of the pair of legs, each slider configured to move along the respective leg, and
   a connecting rod coupled to the sliders.

7. The system of claim 6, wherein the connecting rod includes an outer tube and an inner tube at least partially received in the outer tube and configured for telescopic movement relative to the outer tube.

8. The system of claim 6, further comprising a latch coupled to the truss and configured to receive the connecting rod when the rolling base is in the collapsed-storage position.

9. The system of claim 6, wherein each pair of sliders is configured to rotate relative to the respective connecting rod with movement of the rolling base between the expanded-use and collapsed-storage positions.

10. The system of claim 6, wherein each pair of sliders is configured to move along the respective pair of legs toward the proximal ends of the respective pairs of legs with movement of the rolling base from the expanded-use position to the collapsed-storage position.

11. The system of claim 1, further comprising stacking pins coupled to the truss and configured to engage a secondary appliance-support system to form a stack of appliance-support systems.

12. The system of claim 11, wherein the stacking pins are configured to engage with pin holes of the secondary appliance-support system when the rolling base is in the collapsed-storage position.

13. An appliance-support system comprising
    a truss adapted to support an appliance, the truss having an outer frame and cross bars coupled to the outer frame, and
    a rolling base coupled to the truss, the rolling base including a first support frame extending along a first side of the truss and a second support frame extending along a second side of the truss opposite the first side, each of the first and second support frames including a pair of spaced apart legs, each leg having a proximal end coupled to the truss to allow pivoting movement of the leg relative to the truss and a distal end spaced apart from the proximal end,
    wherein the rolling base is movable relative to the truss between an expanded-use position where the first and second support frames extend downward from the truss and a collapsed-storage position where the first and second support frames extend along an underside of the truss, and the legs of the first support frame rotate toward one another and the legs of the second support from rotate toward one another with movement of the rolling base from the expanded-use position to the collapsed-storage position.

14. The system of claim 13, wherein each of the first and second support frames further includes
    a pair of wheeled supports, one of the wheeled supports coupled to the distal end of one leg of the pair of legs and the other wheeled support coupled to the distal end of the other leg of the pair of legs.

15. The system of claim 14, wherein each leg is configured for telescopic movement to adjust a length of the leg.

16. The system of claim 14, further comprising mount blocks coupled to the outer frame, and wherein the legs are coupled to the mount blocks for pivoting movement relative to the truss.

17. The system of claim 16, further comprising braces coupled to the outer frame and coupled to the legs to block rotation of legs relative to the truss when the rolling base is in the expanded-use position.

18. The system of claim 16, wherein the rolling base extends along the outer frame outside of the outer frame when the rolling base is in the collapsed-storage position.

19. The system of claim 16, further comprising sockets coupled to the frame, and wherein each of the legs are configured to be removed from the mount blocks and received in the sockets such that the rolling base extends from an opposing side of the truss from the mount blocks to support the truss.

20. The system of claim 14, wherein each of the first and second support frames further includes:
    a pair of sliders, one slider coupled to one leg of the pair of legs and the other slider coupled to the other leg of the pair of legs, each slider configured to move along the respective leg, and
    a connecting rod coupled to the sliders.

21. The system of claim 20, wherein the connecting rod includes an outer tube and an inner tube at least partially received in the outer tube and configured for telescopic movement relative to the outer tube.

22. The system of claim 20, wherein each pair of sliders is configured to rotate relative to the respective connecting rod with movement of the rolling base between the expanded-use and collapsed-storage positions.

23. The system of claim 20, wherein each pair of sliders is configured to move along the respective pair of legs toward the proximal ends of the respective pairs of legs with movement of the rolling base from the expanded-use position to the collapsed-storage position.

24. An appliance-support system comprising
a truss adapted to support an appliance, and
a rolling base coupled to the truss, the rolling base including a first support frame extending along a first side of the truss and a second support frame extending along a second side of the truss opposite the first side, each of the first and second support frames comprising:
   a pair of spaced apart legs, each leg having a proximal end coupled to the truss to allow pivoting movement of the leg relative to the truss and a distal end spaced apart from the proximal end,
   a pair of sliders, one slider coupled to one leg of the pair of legs and the other slider coupled to the other leg of the pair of legs, each slider configured to move along the leg,
   a connecting rod coupled to the sliders, and
   a pair of wheeled supports, one wheeled support coupled to the distal end of one leg of the pair of legs and the other wheeled support coupled to the distal end of the other leg of the pair of legs,
wherein the rolling base is movable between an expanded-use position where the legs extend downward from the truss and a collapsed-storage position where the legs extend along the truss, and the legs of the first support frame rotate toward one another and the legs of the second support from rotate toward one another with movement of the rolling base from the expanded-use position to the collapsed-storage position.

25. The system of claim 24, further comprising a keyway coupled to each leg, and wherein the keyways are configured to block rotation of the sliders relative to the legs.

26. The system of claim 24, wherein each leg is formed as a substantially square tube, and wherein each slider is configured to engage with the legs to block rotation of the sliders relative to the legs.

* * * * *

UNITED STATES PATENT AND TRADEMARK OFFICE
CERTIFICATE OF CORRECTION

PATENT NO. : 10,155,527 B2
APPLICATION NO. : 15/421910
DATED : December 18, 2018
INVENTOR(S) : Brad E. Hossler et al.

Page 1 of 1

It is certified that error appears in the above-identified patent and that said Letters Patent is hereby corrected as shown below:

In the Claims

Claim 1 at Column 11, Line 23 should read as follows:
--support frame rotate toward one another with movement--

Claim 13 at Column 12, Line 29 should read as follows:
--frame rotate toward one another with movement of the--

Claim 24 at Column 14, Line 12 should read as follows:
--the legs of the support frame rotate toward one--

Signed and Sealed this
Twelfth Day of February, 2019

Andrei Iancu
*Director of the United States Patent and Trademark Office*